INVENTORS
JOHN L. RODGERS, JR.
BY VERNON K. QUARVE

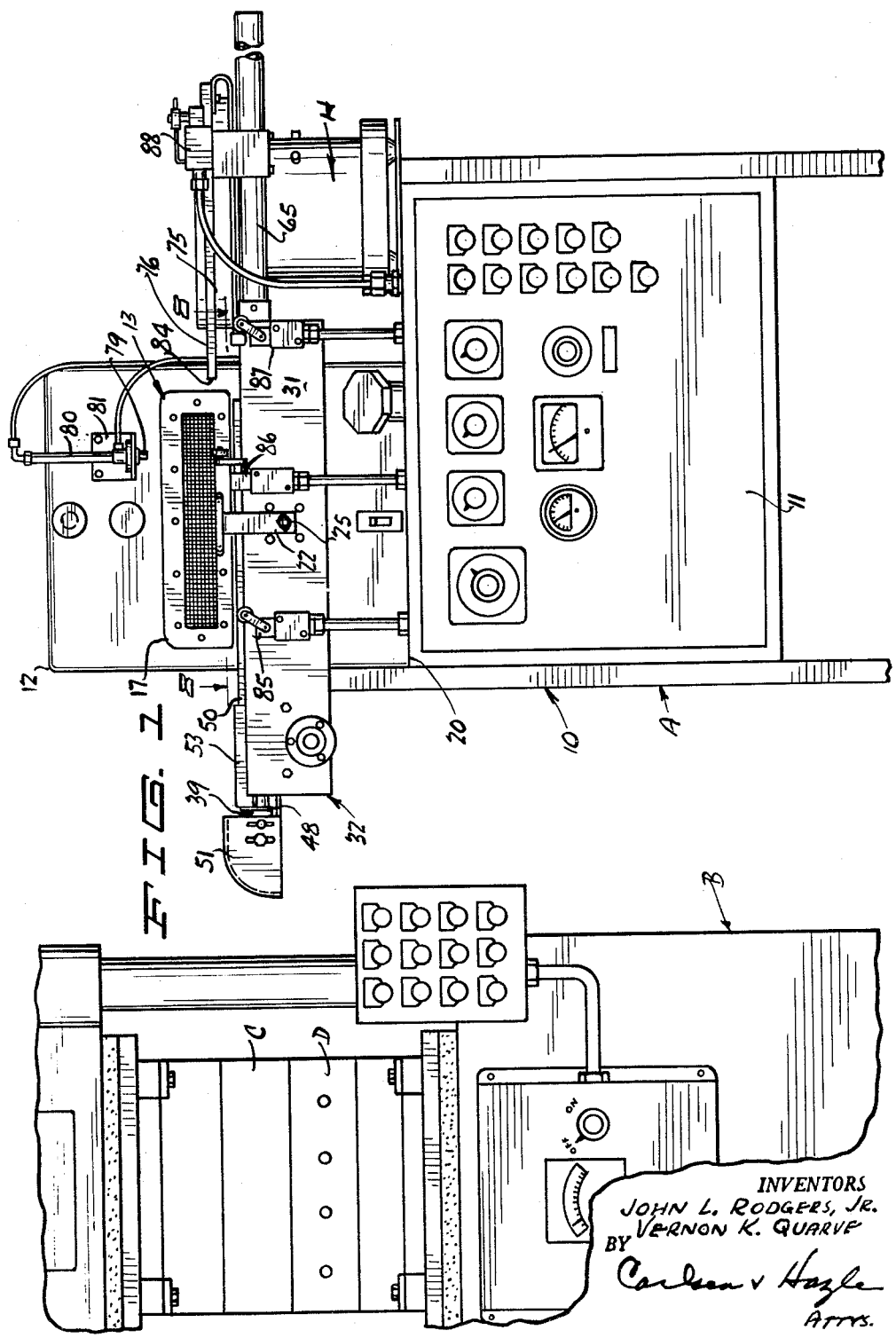

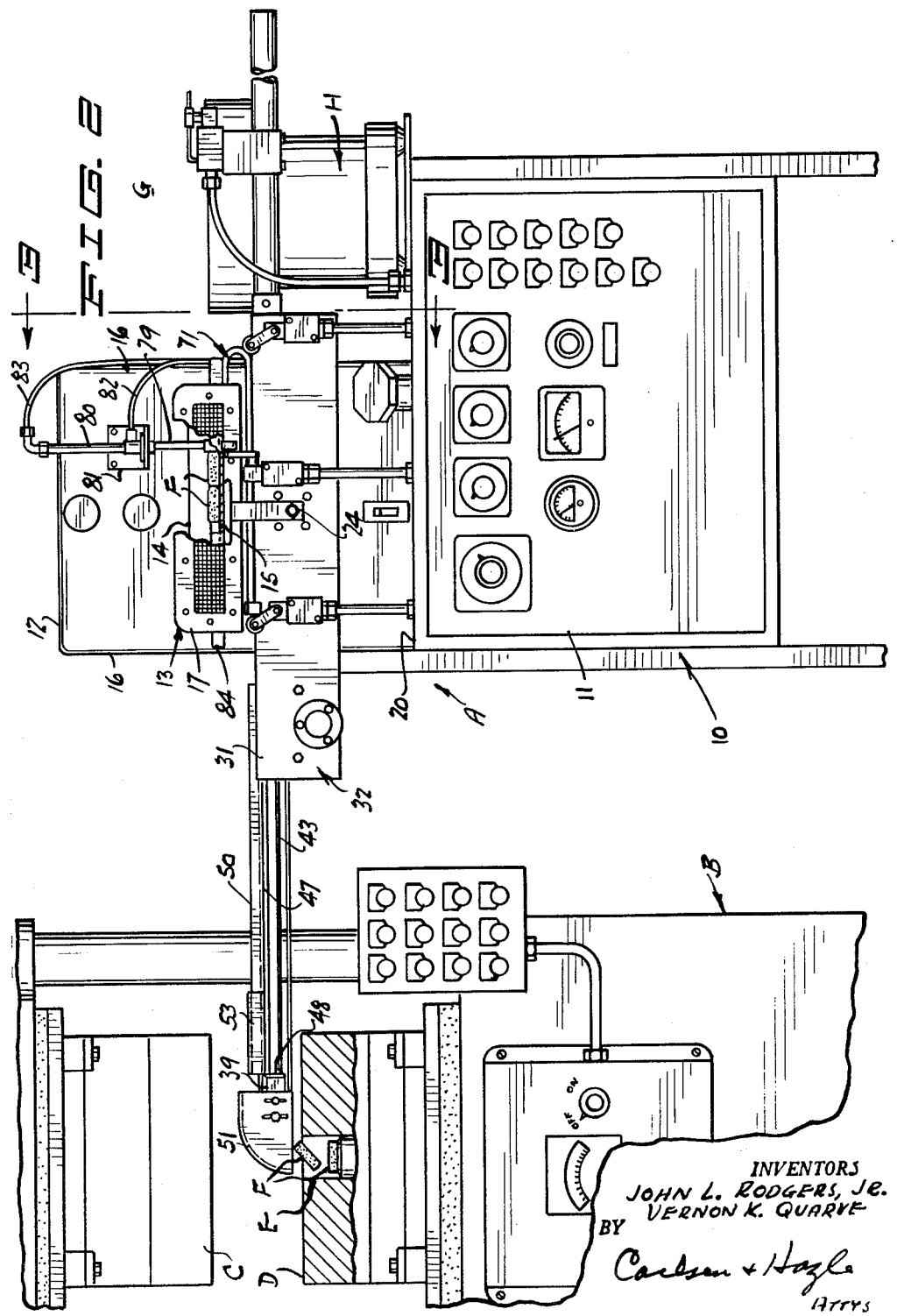

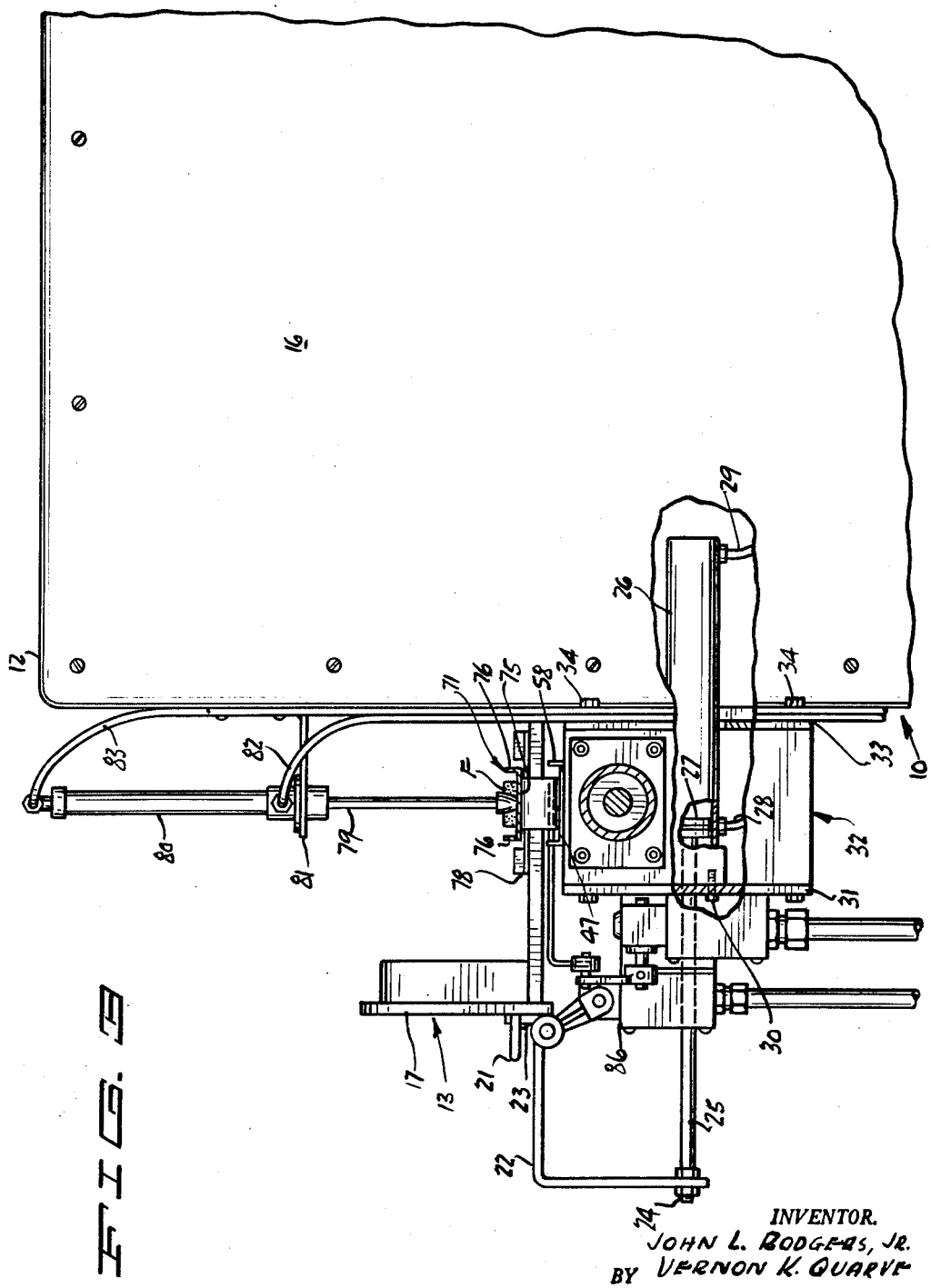

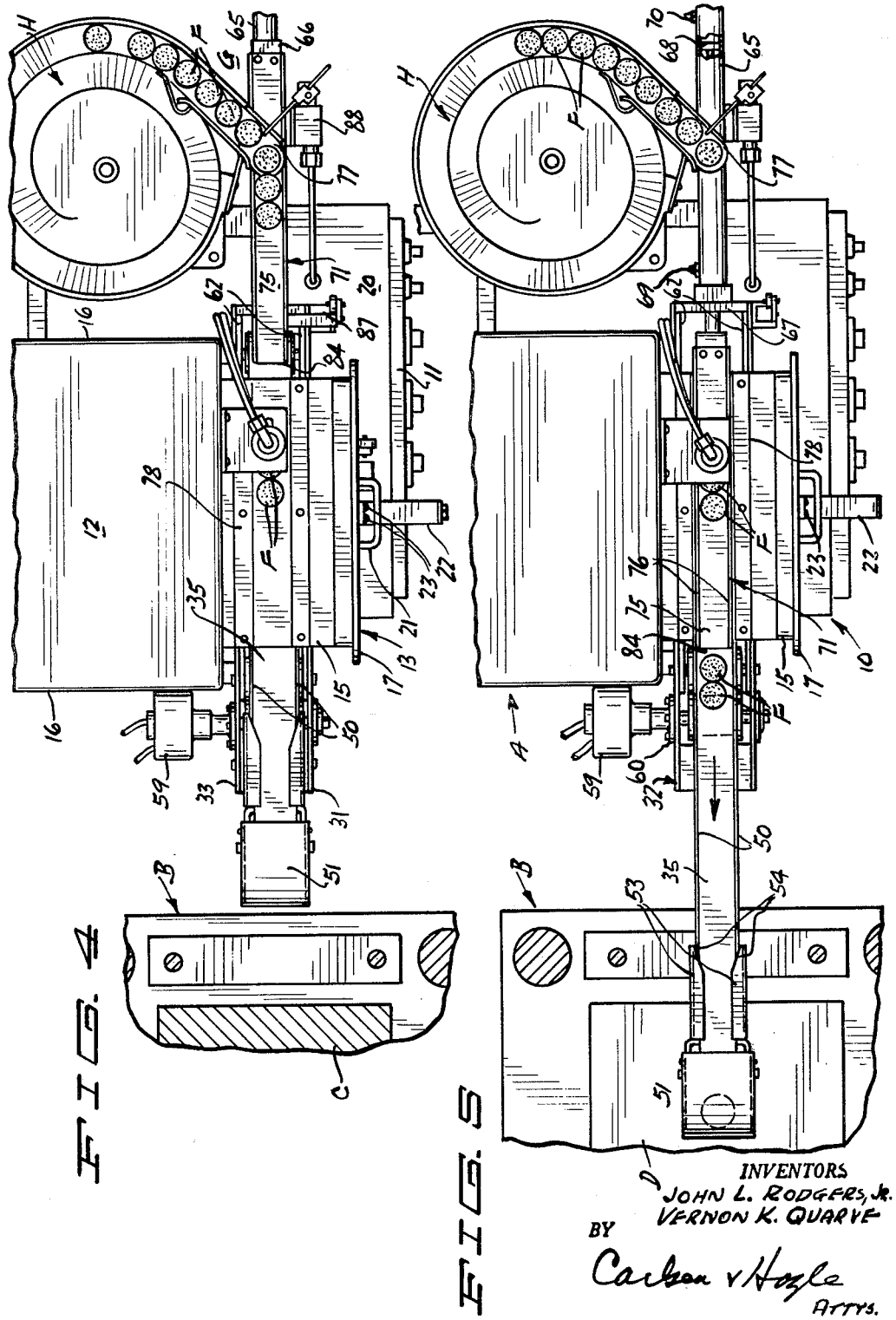

Carlsen & Hoyle
ATTYS.

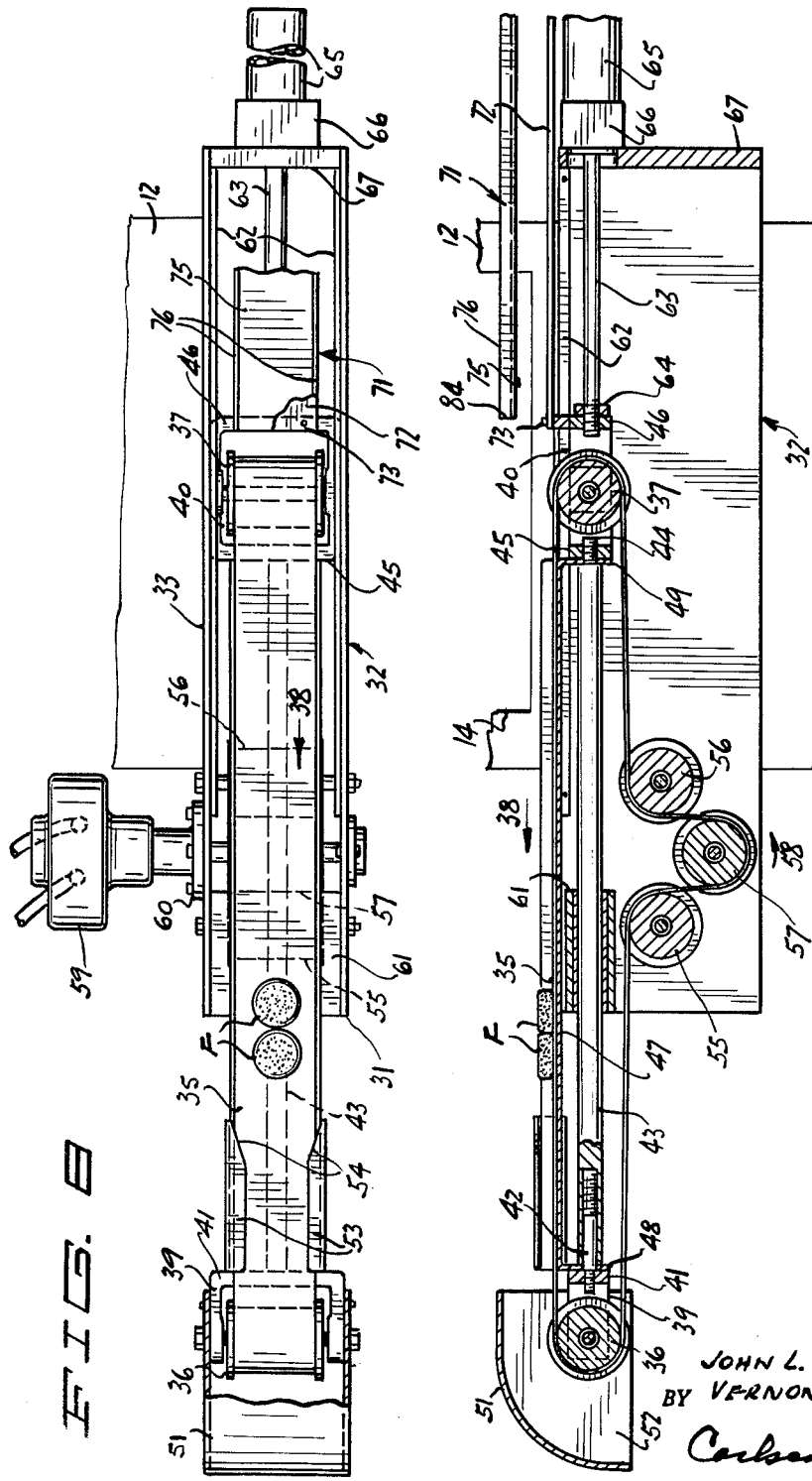

United States Patent Office 3,053,961
Patented Sept. 11, 1962

3,053,961
DIELECTRIC MATERIAL HEATING AND
DELIVERY MECHANISM
John L. Rodgers, Jr., and Vernon K. Quarve, Minneapolis, Minn., assignors to Rodgers Hydraulic Incorporated, Minneapolis, Minn., a corporation of Minnesota
Filed Nov. 16, 1959, Ser. No. 853,070
7 Claims. (Cl. 219—10.69)

This invention relates to improvements in heaters and chargers or loaders for heating and loading accurately selected charges or quantities of molding material repeatedly into a machine such as a plastic molding press, as for example that disclosed in our copending application Serial No. 841,533, filed September 22, 1959, under the title of Automatic Transfer and Compression Plastic Molding Press. In automatic molding presses of this general type there is need for an apparatus by which accurately measured charges of the molding material, such as a thermosetting resin, may be preheated and then loaded into the press in synchronism with the operation thereof, the preheating of each charge taking place while the previous charge is curing in the molds of the press, to thus reduce the cycle time and increase production rate as will be understood by those skilled in the art. The molding material is usually supplied to our equipment in the form of preshaped tablets called preforms so that accurate charges or loads may be preselected by varying the number of preforms used each time. To preheat these shapes or preforms, so that the material will plasticize rapidly once it is loaded into the molds, requires very accurate application of heat to the preforms, both as to the temperature used and the exposure time, so that although they become somewhat softened and doughy in consistency they still retain their integrity to the point that they may be handled and conveyed without difficulty into the press.

It is the primary object of our present invention to provide a preheating and charging mechanism by means of which predetermined numbers of preforms of a dielectric material may be selected, heated to the proper degree and then conveyed into the press and fed to the molds thereof, all in a timed sequence of operations synchronized with the operation of the press itself, and to provide such a mechanism of simple, foolproof construction, which may be readily set up to function as needed, automatically and without requiring any attention over long periods of time. A further object is to provide in mechanism of this kind means for heating the material or preforms by subjecting the same to the influence of a field of high frequency electrical energy, or by what is commonly called dielectric or induction heating. To this end the preforms of selected number are moved between a pair of electrodes, across which is impressed the radio frequency output potential of an oscillator or other source, creating a high frequency field passing through the preforms, and thus heating them uniformly at a rate determined by their loss factor, their dielectric constant and the voltage and frequency of the applied potential. Such heating is, of course, known in the art but further in accordance with an important object of our invention we provide an improved mechanism for moving the preforms into the heating field, which field is confined within a shielded enclosure to reduce or substantially eliminate unwanted radiation, and after exposure for a selected time to then move the heated preforms out of the field and onto a conveyor from whence they are fed by a loading device into the press. The conveyor and its associated parts thus are protected from the effects of the heating field and offer no problem as a result of any unwanted heating of the operating parts and mechanisms.

Still another object is to provide a reciprocating conveyor assembly by which the loading head may be projected into the press to load the preheated material into the molds and, in association with such conveyor system, a mechanism for moving the preforms into loading relation to the oscillator electrodes, and after heating, transferring the preforms onto the conveyor for movement toward the press, all in a properly timed, controlled sequence of operations.

While we herein disclose our invention as associated with a plastic molding press, for the selection, preheating and loading of preforms into the press molds, it is to be understood that we do not limit ourselves to the application of our invention only to the handling and heating of the plastic materials commonly molded by such presses, nor do we limit ourselves to the application of our invention to or its association with a press. The present disclosure is, therefore, to be regarded as exemplary only.

These and other more detailed and specific objects will be disclosed in the course of the following specification, reference being had to the accompanying drawings, in which—

FIG. 1 is a frontal elevation of the mechanism of our invention as arranged in operative association with a plastic molding press, only the molds and adjacent parts of which appear. In this view the conveyor which is projected toward the press for charging the same is illustrated in its retracted or normal position which it assumes when the molds are closed.

FIG. 2 is a view similar to FIG. 1 but showing the conveyor projected into the press, in the act of delivering the preheated plastic material into the lower mold, and with a portion of the heating unit broken away to illustrate the position to which the next load of material is moved as the conveyor assumes such projected position.

FIG. 3 is an enlarged fragmentary side elevation of the upper or cabinet portion of the heating unit, as viewed substantially along the line 3—3 in FIG. 2, and with a portion broken away to disclose an interior detail of construction.

FIG. 4 is a fragmentary plan view of our mechanism and associated components for heating and for selecting desired numbers of preforms for heating, with the conveyor in its retracted position of FIG. 1 and showing a fragment of the press in horizontal section.

FIG. 5 is a similar view but with the conveyor projected to its mold charging position as in FIG. 2.

FIG. 8 is an enlarged fragmentary plan view of the conveyor and associated frame and support components as viewed substantially along the line 8—8 in FIG. 1.

FIG. 9 is a longitudinal vertical sectional view through the structure of FIG. 8.

Figure 6:
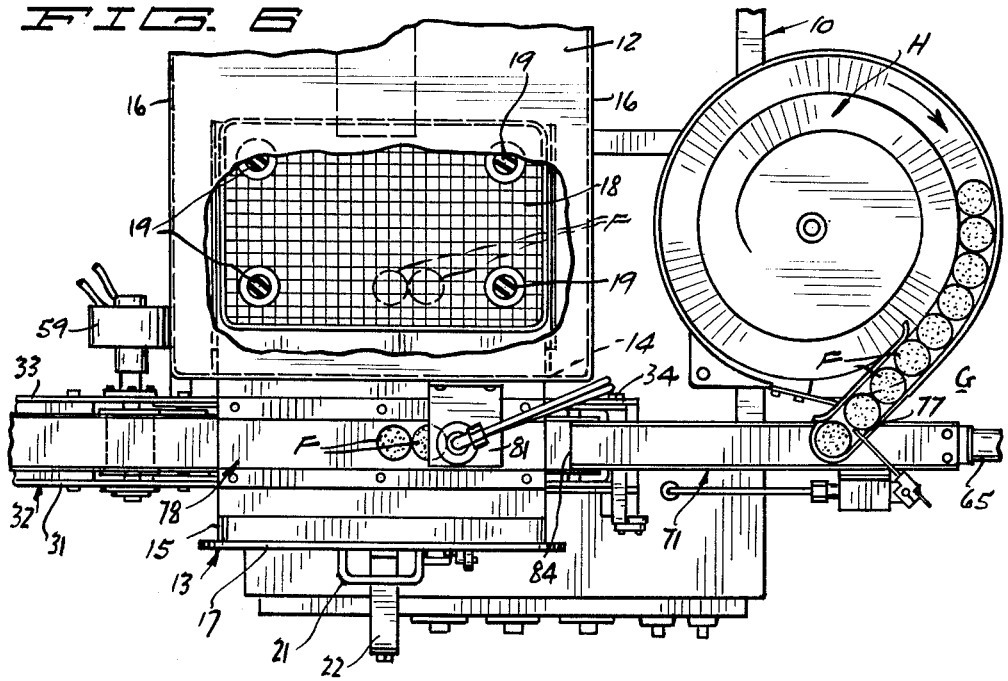
FIG. 6 is a view similar to FIGS. 4 and 5 but omitting the delivery end of the conveyor and any showing of the molding press, in addition to which an upper portion of the heating unit cabinet is broken out to disclose the upper electrode within said cabinet.

Referring now more particularly and by reference characters to the drawings our improved preheating and charging or delivering mechanism is designated generally at A and is herein shown as arranged alongside or adjacent to a plastic molding press B having upper and lower cavitied molds C and D. As seen in FIG. 2 the lower mold D has a pot E designed to receive the casting material and this material is supplied in the shape of preforms F which are round disks or tablets of the compressed raw "plastic," our invention functioning to preheat and deliver to the press a selected number of such preforms in order to properly load or charge the pot E. The press B may be that disclosed in our copending application hereinbefore identified or, of course, any other analogous press and in fact may be any machine or apparatus to which it is desired to supply or feed measured quantities of accurately preheated materials be they of whatever kind so long as they are of a dielectric nature. In any event the mechanism A of our invention is arranged to select measured or predetermined quantities or numbers of dielectric materials or units from what we designate as a supply or source indicated generally at G, to heat the material by subjecting it to the influence of a high frequency energy field and then to deliver the heated material to a discharge point while at the same time bringing more material into position for heating, all in an entirely automatic sequence of operations as will be made clear in the course of the specification to follow.

The mechanism A includes as its basis a conventional high frequency dielectric heating unit having a base and frame structure 10 the forepart of which includes a control and indicator panel 11 having the usual controls for regulating power, frequency and timing, and indicator meters to designate the magnitude of potentials supplied to and developed by the conventional oscillator and power supply (not shown since they are completely conventional) embraced within said unit. Surmounting this unit is a cabinet 12 constituting a shielded enclosure for a high frequency field of radiant energy created therein when the oscillator is in operation, such shielding being required to prevent interference by stray radiations with communication services, as is well known to the art. For this reason access to the heat producing field of energy is through a drawer 13 in the front opening 14 of this cabinet 12, said drawer having a bottom 15 horizontally slidable within the sides 16 of the cabinet, forwardly and rearwardly, to and between open and closed positions in the latter of which the front 17 of the drawer seals said opening 14 to prevent radiation around and about the cabinet to the point that no objectionable interferences will be created. For such reason the cabinet 12 and drawer 13 are constructed of metal, and suspended horizontally within the cabinet above the level of the drawer bottom 15 is an electrode 18 carried by insulators 19 (FIG. 6) and thus insulated from the cabinet structure, which structure is grounded. Thus the drawer bottom 15 functions as the so-called "cold" electrode and cooperates with the electrode 18, as the high frequency output generated by the oscillator is impressed across them, to create therebetween a heating field of energy which, passing through the work when positioned between the electrodes, develops heat therein in the efficient manner well known in this art. As here shown the upper insulated electrode 18 is flat and rectilinear in shape, and of perforated or reticulated construction, but these characteristics may be varied according to the work to be processed in the unit and are influenced by other considerations as well. Of primary importance here is the fact that the heating field is shielded within the grounded cabinet and base structure, that the latter forms a support for the various operating components of our invention, and that the drawer 13 constitutes a reciprocating support by which the preforms F, or other dielectric material to be heated, may be readily moved into and out of said field. In accordance with our invention the standard heating unit of this kind requires only slight modification, by the provision of a guide and support for the preforms on the drawer bottom 15, by addition of means for power operating the drawer between its opened and closed positions, and (preferably) by forwardly offsetting the panel 11 so that a forwardly located upper support surface 20 is provided and the panel itself is moved forward to the point that its controls and indicators will not be obscured or obstructed by the operating components of our invention, all as will be now set forth.

The drawer 13 in the unit herein shown as it is commercially available is ordinarily opened and closed by hand, for which purpose the drawer front 17 has the handle designated at 21. In accordance with our invention, however, we apply an angular bracket 22 to the drawer front by means of screws 23 and this bracket extends downwardly for attachment at 24 to the forward end of a plunger 25 extending rearwardly into an operating cylinder 26 and fitted, within said cylinder, with a piston 27. Thus by the admission of air or fluid under pressure selectively to either end of the cylinder 26, through the lines designated at 28 and 29, the plunger 25 may be reciprocated in a forward-rearward direction to correspondingly adjust the drawer 13 between its opened and closed positions. The cylinder 26 is secured at 30 at its forward end to the forwardmost wall 31 of a conveyor mounting frame, designated generally at 32, and having a corresponding rear wall 33 which is secured by means of bolts or similar fasteners 36 (appearing in FIG. 3 of the drawing) to the cabinet and base structure of the heating unit. The frame 32 extends across the front of the cabinet 12 immediately beneath the drawer 13 and, as best shown in FIGS. 8 and 9, a delivery conveyor of the endless belt type is arranged between the aforesaid walls 31—33. Said conveyor comprises a flexible belt 35 operating over flanged head and tail rollers 36 and 37 to provide an upper horizontal flight which travels in the direction of the arrow 38, in addition to which the conveyor as a whole reciprocates in the same plane and in directions which extend at right angles to the direction of movement of the drawer 13. The construction and arrangement of this conveyor will now be described.

The head and tail rollers 36—37 of the conveyor are respectively journaled in bearings or brackets 39—40, the first of which is U-shaped in plan and has a bight portion 41 into which is threaded a stud 42 securing this bearing to a connector rod 43 extending beneath and parallel to the upper flight of the belt 35. The opposite end of said rod 43 is similarly secured at 44 in the end 45 of the bearing 40, which in this case is rectangular in shape as viewed from above, thus having an end 46 spaced from said end 45 and accommodating the tail roller 37 between the two. Also held in place by the rod 43 is an elongated support pan or trough 47, the ends 48—49 of which are bent downwardly to fit between the rod and the adjacent ends of the bearings 39—40. This trough forms a support for the upper flight of the belt 35 and has upwardly turned marginal flanges 50 to retain the material being conveyed against unwanted escape off the sides of the belt. In addition a hood 51 is secured to the bearing 39, partially enclosing the head roller 36 but having a lower opening 52 off which may be discharged material from the conveyor belt, as will be presently described. Adjacent the hood 51 this conveyor-carrier structure as formed by the combination of the rod 43 and trough 47 also includes inwardly turned, narrow, horizontal flanges 53, the facing edges of which diverge, as seen at 54, at the ends closest to the heating cabinet, in order to properly guide and position the material on the belt, adjacent the delivery end of the conveyor where it enters said hood. The lower flight of the conveyor belt 35 is formed into a loop downwardly between a pair of flanged idler rollers 55 and 56 journaled between the walls 31—33 and bearing downwardly upon this loop is a flanged drive roller 57, also journaled in the same fashion but arranged to be power rotated in the direction of the arrow 58 in FIG. 9 by means of any suitable drive such as an air or fluid actuated motor 59 having a mounting flange 60 by which it is secured to the wall 33 adjacent the side of the cabinet 12. By the application of torque to this drive roller 57 the conveyor belt 35 will be caused to travel in the direction indicated by the arrow 38, as will be readily understood. In addition, however, this conveyor structure except for the walls 31—33, the rollers 55, 56 and 57 and the drive motor 59, is arranged to reciprocate for which purpose the aforesaid rod 43 is slidably mounted through a bearing 61 joining the upper corners of the walls 31—33 toward the delivery end of the sturcture. Said bearing is provided with a bushing, as indicated in FIG. 9, and in order to prevent twisting of this reciprocating assembly the tail roller bearing 40 is guided between inwardly projecting rails 62 on the walls as clearly shown. For reciprocating the conveyor structure we provide a plunger 63 which is secured at its end at 64 to the end 46 of the tail roller bearing 40 and reciprocatably mounted within an elongated cylinder 65, one end 66 of which is firmly secured to a cross piece 67 joining the walls 31—33 at the ends thereof remote from the delivery end of the conveyor. Within said cylinder 65 the plunger 63 is provided with a piston 68 (appearing only in FIG. 5) and the arrangement is thus obviously such that the selective admission of fluid to the opposite ends of the cylinder 65, through lines appearing at 69 and 70 (also in FIG. 5), will reciprocate the plunger 63 and correspondingly actuate the conveyor structure. Thus it is possible to move the conveyor from its normal or loading position, at which it appears in FIGS. 1, 4, 8 and 9, to a projected, discharge or delivery position at which the hood 51 enters the press between the upper and lower molds C and D, as is indicated in FIGS. 2 and 5. It is important to note that since the idler rollers 55—56 and drive roller 57 are all stationary, except as to rotation, this reciprocation or translation of the conveyor will result in a drag being exerted upon the lower flight of the belt 35 such that the upper flight thereof must travel in the direction of the arrow 38 as a function of this movement of the conveyor and before the running of the conveyor belt by operation of the drive motor 59. The purpose of this arrangement will be presently made clear.

In addition to the conveyor belt 35 the reciprocating conveyor structure just described also carries and moves a carrier-pusher element, designated generally at 71, taking the form of a U-shaped yoke having a lower leg 72 with an extremity secured at 73 to the upper edge of the tail roller bearing end 46. From this mounting the leg 72 extends out in a horizontal plane in a direction opposite that of the conveyor itself and it is joined by a bight 74 to an upper shallow trough 75 having upstanding marginal flanges 76. This trough 75 is disposed in a plane such that it will move over the bottom 15 of the drawer 13, when the latter is in its open position and as the conveyor is moved toward its discharge or delivery position as has just been set forth. In the normal position of said conveyor the trough 75, however, is located beneath the discharge gate 77 of a conventional sorting and selecting unit particularly suitable for handling tableted materials such as the plastic preforms here under consideration. This unit is designated at H and is commercially available under the name "Syntron." The base of the unit H is secured on the upper wall 20 of the base structure 10 alongside the cabinet 12 and functions to deliver any predetermined or preselected number of the preforms F onto the trough 75 each time the same returns to its normal position following the travel of the conveyor to its aforesaid delivery position. Thus as here shown this "Syntron" unit H constitutes the aforesaid supply or source G from which the material to be processed is taken.

The drawer bottom 15 is provided with a shallow guideway 78 which is open at its ends and is positioned in the same vertical plane as the conveyor when the drawer is in its open position, as best seen in FIGS. 4 and 6. Said guide 78 is designed to receive preforms F from the trough 75 as the same moves over the drawer bottom and the guide is made of a dielectric material or insulator having a dielectric constant differing from that of the preforms, so that as the latter come to rest upon the drawer they will be insulated from the drawer bottom which functions as aforesaid as the cold electrode of the heating unit.

This is desirable not only to best position the preforms with reference to the heating field developed between the electrodes, but also to guide the preforms for movement in a plane which parallels that of the conveyor and the loading trough as will be readily appreciated. Also operatively associated with the drawer 13 is a vertically movable stop member or plunger 79 which reciprocates in a cylinder 80 secured by means of a bracket 81 to the front of the cabinet 12. Normally the plunger 79 is pulled upwardly to the position of FIG. 1 by pressure of air or fluid supplied to one of the lines 82—83 leading to opposite ends of the cylinder 80, but by reversing the direction of flow to the cylinder the plunger may, when desired, be thrust downward to a point at which its lower extremity will reach into the trough 75 in order to engage preforms F which have been moved by said trough into the loading position relative to the drawer. The plunger is shown in such position in FIGS. 2 and 3. It is further to be noted that the elevation of the trough 75 is such that its end 84 will strike preforms F which have rested upon the guide 78 during a certain part of the cyclic operation of the mechanism shortly to be described.

In the description of the operation which follows it will be assumed that the admission of actuating fluid or air not only to the drive motor 59 but also to the various actuating cylinders 26, 65 and 80 will be controlled and timed by the use of the various well known control mechanisms and supply systems used in apparatus of this kind and since such components and systems are well known in the art, they are not shown and not described in detail herein. It will, however, be noted that we have shown a series of micro-switches, indicated at 85, 86, 87 and 88, all so located and arranged that they will be actuated as the conveyor and carrier-pusher assembly reciprocates and as the drawer 13 moves to and between its opened and closed positions. These switches, of course, serve to control the various valves which in turn supply the fluid as needed to the various operating components and in addition this cyclic operation will be tied in with the automatic control system for the press B, as well as suitable controls for the heating unit.

Figure 7:
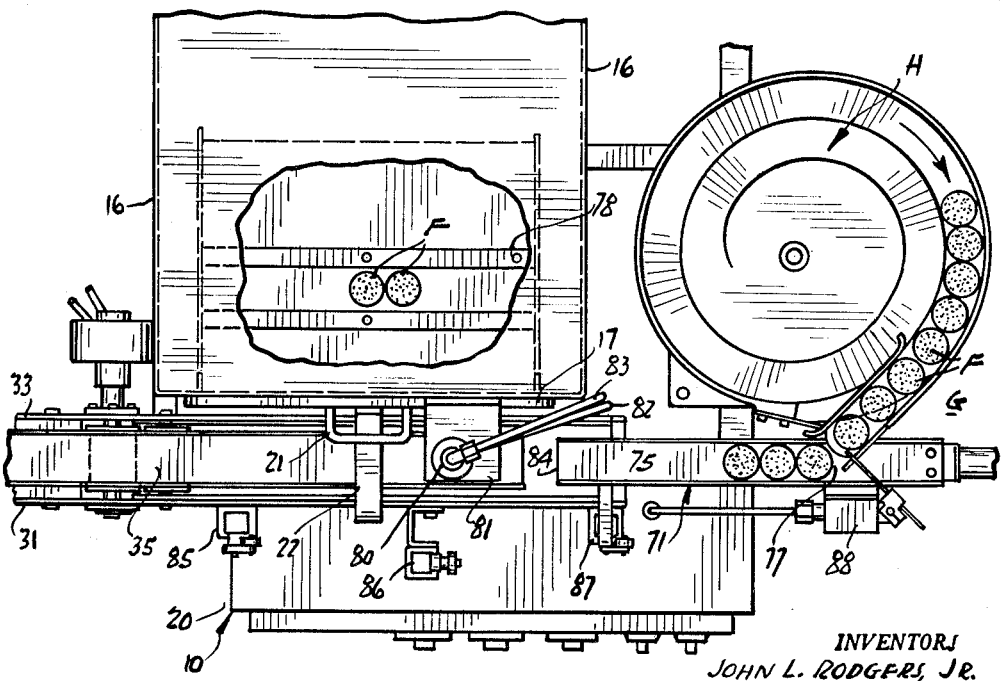
FIG. 7 is a similar view but with the cabinet broken out, along with that portion of the upper electrode which would otherwise appear, in order to show the drawer-like support by which the material is loaded into the heating field and to disclose the material in position for heating thereby.

In operation assuming the preforms F are to be selected, heated and then fed to the press in twos to properly charge the pot E in the lower mold D the preforms from the supply G will be fed from the loading gate 77 of the "Syntron" unit onto the trough 75 of the carrier-pusher element 71 when the same is moved to its normal or starting position at which it is seen in FIGS. 1 and 4. At such time the drawer 13 is opened and it may be assumed that previously a pair of the preforms F will have been deposited on the drawer guide 78. The drawer now closes and these preforms on the guide 78 are carried into the heating field the shielding of which is completed as the drawer front 17 closes the cabinet opening 14. The preforms thus assume the position seen in dotted lines in FIG. 6 and in the full lines of FIG. 7. In the latter view, incidentally, the delivery gate 77 is seen as arranged to feed three instead of two preforms onto the trough, as an illustrative modification only.

As soon as the preforms in the heating field have had the proper exposure and reached the desired temperature the drawer 13 opens and the conveyor moves in the direction of arrow 38 toward its projected delivery position. As this occurs the trough 75 moves across the drawer bottom 15, the end 84 of the trough engages and pushes the hot preforms off the guide 78 onto the conveyor belt 35, at the same time moving the next pair of preforms into position above this guide as seen in FIG. 5. During the time that the conveyor is moving toward its delivery position the drag on the belt 35 created by the rollers 55, 56 and 57 as aforesaid causes an initial movement of the belt in the direction of arrow 38 so that the instant the hot preforms are pushed off the guide 78 they are moved away toward the press and clear of the drawer. As the conveyor hood 51 reaches the position over the lower mold D the motor 59 starts and the conveyor belt 35 is run long enough to carry the hot preforms into the hood and drop them of the end of the belt as seen in FIG. 2, at which juncture the motor 59 is shut off. At the same time the plunger 79 is pushed downward "behind" the preforms F on the trough 75 (FIGS. 2 and 3) and now as the conveyor and the carrier-pusher return to their starting positions the plunger acts as a stop, forcing these preforms off the end 84 of the trough 75 and onto the guide 78, the plunger returning to its upper, starting position as soon as this is accomplished and in time to clear the drawer 13 as the same closes and the next heat cycle begins.

The operation is thus seen to be simple and straightforward in nature and once set up is readily carried out in repeated sequential actions which may be readily synchronized with the operation of the press and adjusted to accommodate proper exposure time for exactly heating the preforms to the degree desired. Our invention further lends itself to use in other fields, wherever a material of a dielectric nature is to be heated or similarly processed by high frequency radiant energy and since a conventional, commercially available unit for the purpose may be readily modified for full automatic operation by use of our inventive concept many operations heretofore carried out largely by manual selection of material and loading and unloading, may be modernized with a resulting increase in efficiency as well as uniformity in treatment from one load to another. In most instances shops in which this equipment is installed will include a compressed air supply and air-electric control for the operating components of our invention will be most satisfactory but we do not, of course, limit ourselves to such arrangements.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In mechanism of the character described for heating and conveying dielectric material from a supply to a discharge point, a dielectric heating unit having a electrodes across which a high frequency potential is impressed to create a heating field, an endless conveyor leading from a point adjacent to but shielded from said field to said discharge point for delivering heated materials, a reciprocating support member moving into and out of said field in a plane above that of the conveyor, a reciprocating carrier member moving from the supply to a point above said support member to deliver material to the support member for transfer thereon into the heating field and then to push the heated material off the support member onto said conveyor for delivery to said discharge point, and means for operating the conveyor, support and carrier member.

2. Mechanism of the character described for heating and conveying dielectric material from a supply to a discharge point, comprising a dielectric heating unit having electrodes across which a high frequency potential is impressed to create a heating field, an endless conveyor leading from a point adjacent to but shielded from said field to said discharge point for delivering heated materials, a reciprocating support member moving into and out of said field in a plane above that of the conveyor, a reciprocating carrier member moving from the supply to a point above said support member to deliver material to the support member for transfer thereon into the heating field and then to push the heated material off the support member onto said conveyor for delivery to said discharge point, means for operating the conveyor, support and carrier member, the conveyor and carrier member both moving the material in the same direction but the support member moving at right angles to that direction.

3. Mechanism of the character described for heating and conveying plastic preforms from a supply to a discharge point, comprising a dielectric heating unit having electrodes across which a high frequency potential is impressed to create a heating field, an endless belt conveyor leading from a point adjacent to but shielded from said field and toward said discharge point for delivering heated preforms thereto, a reciprocating support member moving into and out of said field in a plane above that of the conveyor and at right angles thereto, a reciprocating carrier member moving from the supply to a point above said support member to first deliver preforms to the support member and transfer said preforms into the heating field and then in a succeeding operation to push the heated preforms off the support onto said conveyor for delivery to said discharge point, means reciprocatably supporting said conveyor for movement in a plane parallel to but below that of said carrier member, and means for operating the conveyor, support member and carrier member.

4. In mechanism of the character described for heating and conveying plastic preforms from a supply to a discharge point and for use with a dielectric heating unit having electrodes across which a high frequency potential is impressed to create a heating field, an endless belt conveyor leading from a point adjacent to but shielded from said field and toward said discharge point for delivering heated preforms thereto, a reciprocating support member moving into and out of said field in a plane above that of the conveyor and at right angles thereto, a reciprocating carrier member moving from the supply to a point above said support member to deliver preforms to the support member and transfer said preforms into the heating field and then to push the heated preforms off the support onto said conveyor for delivery to said discharge point, means reciprocatably supporting said conveyor for movement in a plane parallel to but below that of said carrier member, and a stop member movable down into the path of preforms on the carrier as the same moves back toward the supply to push said preforms off onto the support member.

5. For use in conjunction with a dielectric heating unit having a housing containing means for creating a high frequency energy field and a reciprocating drawer for moving work into said field for heating thereby as the drawer is closed and to remove the material from the field as the drawer is opened; mechanism of the character described for heating and conveying dielectric materials from a supply thereof, comprising a conveyor and means mounting the same on the cabinet adjacent said drawer but in a position shielded from said field when the drawer is closed, a carrier-pusher element and means reciprocatably mounting the same for movement from said supply over the open drawer to carry material from the supply to the drawer, means for pushing the material off said carrier-pusher element as the same moves back toward the supply for more material and before the drawer closes, said carrier-pusher element engaging the heated material as the drawer again opens to thereby push the material off the drawer onto the conveyor for delivery thereby, and separate means for synchronously operating the conveyor, the drawer and the carrier-pusher element.

6. For use in conjunction with a dielectric heating unit having a shielding housing containing means for creating a high frequency energy field and a reciprocating drawer for moving work into and out of said field for heating thereby; mechanism of the character described for heating and conveying plastic preforms taken from a supply thereof, comprising a conveyor and means mounting the same on the cabinet below said drawer and in a position shielded from said field when the drawer is closed, a carrier-pusher element and means reciprocatably mounting the same for movement from said supply over the open drawer to carry preforms from the supply to the drawer, means for dropping the preforms from said carrier-pusher element as the same moves back toward the supply for more and as the drawer closes, said carrier-pusher element on its next movement engaging the heated preforms as the drawer again opens to thereby push these preforms off the drawer and onto the conveyor, and separate means for operating the conveyor, drawer and carrier-pusher element.

7. For use in conjunction with a dielectric heating unit having a shielding housing containing means for creating a high frequency energy field and a reciprocating drawer for moving work into and out of said field for heating thereby; mechanism of the character described for heating and conveying plastic preforms taken from a supply thereof, comprising a conveyor and means mounting the same on the cabinet below said drawer and in a position shielded from said field when the drawer is closed, a carrier-pusher element and means reciprocatably mounting the same for movement from said supply over the open drawer to carry preforms from the supply to the drawer, means for dropping the preforms from said carrier-pusher element as the same moves back toward the supply for more and as the drawer closes, said carrier-pusher element on its next movement engaging the heated preforms as the drawer again opens to thereby push these preforms off the drawer and onto the conveyor, and separate means for operating the conveyor, drawer and carrier-pusher element, said means for dropping the preforms from the carrier-pusher element onto the drawer consisting of a movable stop member movable into the path of these preforms as said carrier-pusher element moves back toward the supply.

References Cited in the file of this patent

UNITED STATES PATENTS

| | | |
|---|---|---|
| 2,472,472 | Ellsworth | June 7, 1949 |
| 2,506,425 | Journeaux | May 2, 1950 |
| 2,604,577 | Strickland et al. | July 22, 1952 |
| 2,657,301 | Kincaid et al. | Oct. 27, 1953 |
| 2,840,678 | Hill et al. | June 24, 1958 |
| 2,853,588 | Brown | Sept. 23, 1958 |
| 2,876,325 | Baffrey | Mar. 3, 1959 |
| 2,959,660 | Schmidt | Nov. 8, 1960 |

FOREIGN PATENTS

| | | |
|---|---|---|
| 623,000 | Great Britain | May 11, 1949 |